Nov. 21, 1950     C. A. ATWELL ET AL     2,530,932
COMPENSATING COIL
Filed Sept. 9, 1949
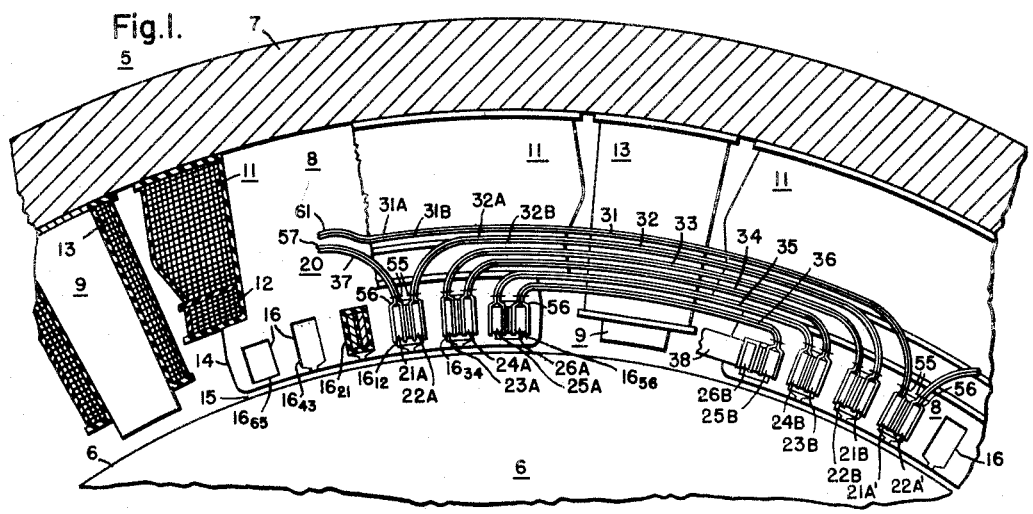
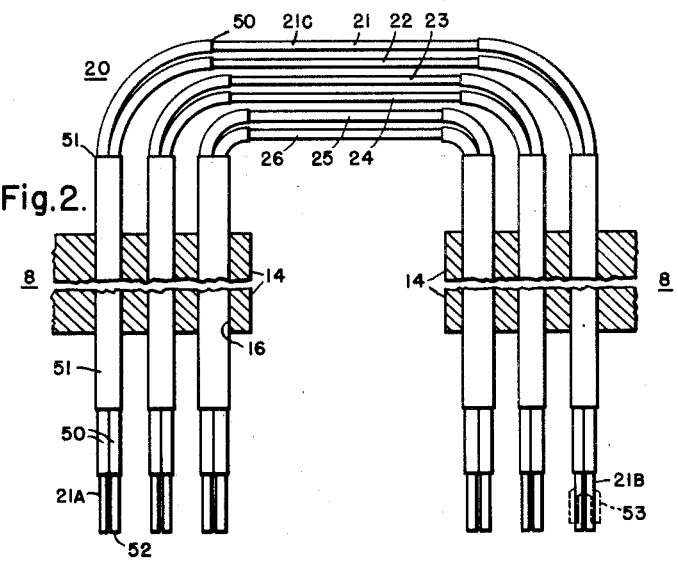
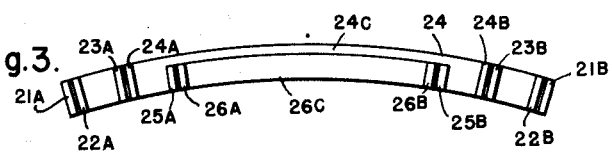
WITNESSES:
INVENTORS
Clarence A. Atwell &
Richard H. Wagner.
BY
ATTORNEY

UNITED STATES PATENT OFFICE 2,530,932

COMPENSATING COIL

Clarence A. Atwell and Richard H. Wagner, Pittsburgh, Pa., assignors to Westinghouse Electric Corporation, East Pittsburgh, Pa., a corporation of Pennsylvania Application September 9, 1949, Serial No. 114,763

6 Claims. (Cl. 171—252)

Our invention relates to a compensating winding, or other concentric winding, for a dynamo-electric machine, such as a direct-current generator for use in a Diesel-electric locomotive.

While our invention is not limited thereto, it was particularly designed for, and is particularly adapted to, the service just mentioned, namely a generator of a Diesel-electric installation on a railway-locomotive. In such service, the space and weight requirements are particularly stringent. A pole-face compensating winding is necessary, in order to control the shape of the field-flux distribution sufficiently well to obtain acceptable commutation and freedom from flashing. However, such a compensating winding, while necessary, is itself an evil, because it has to be placed in slots in the pole-face portions of the main poles, and these slots rather seriously reduce the effective cross-sectional area through which the pole-piece flux must pass. This reduction in area causes magnetic saturation, which in turn necessitates the addition of a rather considerable number of extra ampere-turns in the main field-windings, in order to maintain the required field-flux strength.

Various practical considerations dictate that the pole-face slots, for such compensating windings, shall be either closed or partially closed, so that the compensating-widing conductors have to be driven into their slots, from one end of the machine. The machine is also of such size and rating that it is a practical necessity to use heavy strap-conductors for the compensating winding.

Heretofore, the compensating windings for machines intended for the service described have been built with sufficient insulation surrounding each coil-side to provide the necessary ground-insulation thickness between each coil-side and the walls of the pole-face slot in which it is disposed. It has been known to place two coil-sides, of two compensating coils, in the same pole-face slot, both in machines having open slots, and in machines having closed or partially closed slots. However, when the slots have been closed or partially closed so that the coils could not be assembled through the face of the slot, but had to be driven in from the end of the slot, the use of multiple compensating coils has entailed the use of a double thickness of ground-insulation, separating the conductors of the two coil-sides which lies side-by-side in the slot, thereby requiring a rather wide slot which is quite objectionable from the standpoint of reducing the effective flux-carrying cross-section of the pole-face portion, and requiring more ampere-turns in the main field-winding.

The problem is complicated, however, by reason of the fact that the compensating winding is made of heavy strap-conductors which are not readily bendable, and by the fact that the ends of the straight coil-sides which are driven through the slots, in the assembly-operation, have to be spread apart, in practicing our invention, so that the two coil-sides, which lie close together in the slots, must be separated, at their ends, so as to make it possible to solder the end-connectors to the separate ends.

The object of our present invention is to provide an improved compensating-winding construction, for machines of the type mentioned, in which each of the strap-conductors of which such coils are made is covered with only a thin or light conductor-insulation, so that, when two or more coil-sides are placed side-by-side in a slot, they will be separated by a thickness of insulation which is only sufficient for coil-to-coil insulation, which is rather considerably smaller thickness than the thickness required for the relatively heavy coil-to-ground insulation between the conductors and the walls of the slots. Each slot is provided with an insulating slot-liner which surrounds the two or more conductors lying in that slot, so as to provide the necessary ground-insulation.

The compensating winding of our present invention preferably comprises hairpin-type coils, which are disposed in pairs, with their coil-sides paired in the same pole-face slots. These coil-sides are straight, and parallel to each other, out to their very ends, at the time when said paired coil-sides are driven into a slot, from one end of the slot, but after a pair of hairpin coils have been inserted in place, the ends of the two adjacent coil-sides are forced away from each other, so as to provide the necessary spacing for soldering the end-connections thereto, for making connection from the second end of one coil to the first end of the next adjacent coil, so as to serially connect the concentric coils of each pole.

With the foregoing and other objects in view, our invention consists in the machines, combinations, systems, parts, and methods of assembly and operation, hereinafter described and claimed, and illustrated in the accompanying drawing, wherein:

Figure 1 is a somewhat diagrammatic fragmentary transverse sectional view, showing some of the poles of a ten-pole direct-current generator embodying our invention, looking at the end-connector end of the compensating winding, with some parts broken away to better illustrate the construction;

Fig. 2 is a fragmentary developed plan-view of the concentric compensating hairpin-coils for one pole, looking outwardly from the airgap of the machine;

Fig. 3 is a view, similar to Fig. 1, showing only the hairpin-coil portions of a set of concentric compensating coils, for one pole, disposed in the positions which they will occupy when they are in position to have their coil-sides pushed through the respective pole-face slots, but before this operation has taken place, so that Fig. 3 shows just the hairpin-coils alone, removed from the machine, and of course without the end-connectors which are shown in Fig. 1; and Fig. 4 is a diagrammatic representation of the generator, showing the various terminals thereof.

As shown in Figure 1, our invention is applied to a direct-current generator having a stationary field-member 5 and a rotor 6. The stationary field-member 5 has a cylindrical peripheral yoke-member 7, having inwardly projecting main pole-pieces 8 and commutating-pole or interpole pieces 9 secured thereto. The main pole-pieces 8 are excited with shunt-type windings 11, and sometimes also series compounding windings 12. The interpoles 9 are excited with interpole or commutating windings 13.

The main poles 8 are provided with pole-face portions 14, which face the airgap 15 which separates the field-structure from the rotor-structure 6. These pole-face portions 14 are provided with slots 16 for receiving the coil-sides of the compensating winding 20, which is a concentric winding extending from one half of the pole-face portion of one main pole to the next adjacent half of the pole-face portion of the next adjacent main pole.

The essential connections of the various windings are shown in Fig. 4, in which the circle 6 represents both the armature and the commutator, in accordance with a familiar convention. From one main terminal T1 of the generator, as shown in Fig. 4, the main circuit is illustrated as progressing first through the compensating winding 20, then through the armature 6, then through the interpole winding 13, and finally through the compound main-pole winding 12, and thence to the second main terminal T2 of the machine. The field-winding 11 is provided with separate terminals F1 and F2, so that it can be connected to any suitable excitation-source.

In accordance with our invention, the compensating winding 20 is made up of assorted sizes of hairpin-type coils 21 to 26, which are best seen in Figs. 2 and 3, and assorted sizes of internested end-connectors 31 to 36, which are best seen in Fig. 1, and also certain terminal end-connectors 37 and 38.

Each of the hairpin-type coils, such as 21, has two straight coil-sides 21A and 21B, which are joined, at the rear end, by an end-portion 21C. The hairpin-type coils 21 to 26 are disposed in pairs, such as 21—22, 23—24, and 25—26, each pair having its coil-sides paired in the same pole-face slots. In the preferred design which is illustrated in the drawing, there are only two paired coil-sides, such as 21A and 22A, in each pole-face slot, but it is conceivable that our invention may be applicable to a construction in which three or more hair-pin-type coils may be "paired" together, in which case there would be three or more "paired" coil-sides in each pole-face slot.

The hairpin-type coils 21 to 26 are made out of a heavy conductor-material, such as a strap-conductor material. At least the straight coil-sides, such as 21A, 22A, etc., are covered with relatively thin insulating-material 50, which is of a suitable thickness for coil-to-coil insulation, so that, in each of the pole-face slots 16, the two side-by-side coil-sides, such as 21A and 22A, are separated by a double thickness of the insulation 50, which provides the relatively small separation which is necessary to insulate these two coil-sides from each other. In each slot 16, the pair of coil-sides is surrounded by relatively thick insulation 51, which may serve as a slot-liner, so that one thickness of the liner-insulation 51, plus one thickness of the conductor-insulation 50, provides adequate ground-insulation in each slot. In this way, the sizes of the respective slots 16 can be made smaller than would have been possible if the conductor-insulation 50 had been made heavy enough to substantially take care of the required thickness of ground-insulation, without requiring the slot-cell 51.

In accordance with our invention, the paired coil-sides, such as 21A and 22A, initially have to be straight and parallel, down to their front ends 52, as shown in Fig. 2, so that they can be inserted, together, into the proper slot 16, and forced all the way therethrough, until the front ends 52 project out of the slots at the front end of the machine. It is then necessary to separate these front ends of the paired coil-sides from each other, as shown in dotted lines at 53 in Fig. 2, so that the front ends of the paired coil-sides, such as 21A and 22A, are separated from each other by considerably more than the double thickness of the conductor-insulation 50, as is apparent from the positions of the coil-ends, as shown in Fig. 1.

These separated front ends of the successive concentric hairpin-type coils are then properly joined by the several nested end-connectors 31 to 36, as shown in Fig. 1, in a manner which is known in the art. Preferably, however, as shown in Fig. 1, each of these connectors is made of two heavy strap-conductors, such as 31A and 31B, or 32A and 32B, etc. The two strap-conductors of each end-connector are joined together at a plurality of points, as indicated at 55, so that they lie one against the other, except at their ends, at which points the two heavy strap-conductors of each connector are separated from each other, so as to provide a forked construction 56 which embraces the associated coil-end of one of the hairpin coils. This forked end-construction of the connectors 31 to 36, or of those connector-ends which engage the coil-ends, provides a large contact-surface for making a good soldered joint between the connectors and the coils.

The connectors 31 to 36 are so disposed that they join a second end of one coil to a first end of the next adjacent coil, so as to serially connect the concentric coils of each pole. Thus, if we start at the center-line of any one of the main poles 8 in Fig. 1, and give its pole-face slots 16 distinguishing subscripts in accordance with the last figures of the numerals designating the hairpin-coils 21 to 26 which lie therein, in the order in which the straight coil-sides are disposed around the circumference, the three slots 16 at the right half of any pole-face will be numbered $16_{12}$, $16_{34}$, and $16_{56}$, starting at the center of the pole-piece, whereas the three slots 16 in the left half of the pole-piece will be numbered $16_{21}$, $16_{43}$, and $16_{65}$, respectively, again starting at the center of the pole. It will be understood, of course, that the coils 21 to 26 extend from the right-hand half of one main pole 8, to the left-hand half of the next main pole to the right of it, but since all of the main poles 8 are alike, their slots 16 can be numbered alike.

Then, if the left-hand end 57 of the terminal end-connector 37 is regarded as the input-lead of a set of concentric compensating coils for one pole of the machine, it will be seen, from Fig. 1, that the right-hand end of this connector 37 is connected to the first end 21A of the hairpin-coil 21, this end 21A projecting out from the left-hand half of the slot $16_{12}$ of a main pole 8, at the front end of the machine. The circuit then continues through the coil-side 21A, to the rear end of the machine, where the end-portion 21C of the hairpin-coil continues the circuit over to the rear end of the coil-side 21B, which lies in the right-hand half of the slot $16_{21}$ of the next main pole 8 to the right of the first-mentioned main pole 8. The coil-side 21B brings the circuit to the front end of the machine, so as to constitute the second end of the coil 21. The end-connector 32 then connects this second end 21B of the coil 21 to the first end 22A of the next smaller hairpin-coil 22.

Thus the circuit continues, through successive coils, until the left-hand end of the connector 36 brings the circuit to the first end 26A of the innermost hairpin-coil 26. The second end 26B of this innermost coil 26 is connected to the connector 38, which may be regarded as the output-lead of this pole of the compensating winding. The left-hand end 61 of the connector 31 may be regarded as the input-lead for the next pole of the compensating winding, which may be distinguished by the primed characters 21A' and 22A', etc., in Fig. 1.

It will thus be seen that, by the use of paired concentric hairpin-coils, such as 21 and 22, which have their coil-ends extending out of the front end of the stator-core or pole-piece of the machine, and by then pressing the paired front coil-ends apart, after they have been inserted through the slot $16_{12}$ which contains them, we have provided a construction whereby the end-connectors 31 to 38 may be suitably connected to successive coil-ends.

Our construction also lends itself to the maximum saving in regard to the space which is occupied, in the slots 16, by the several coil-sides, because the individual coil-conductors may be wrapped with relatively thin coil-to-coil insulation 50, while the paired coil-sides are wrapped or encased in a ground-insulation or slot-liner 51, which makes each slot contain only the minimum amount of insulation which is required respectively for coil-to-coil insulation and for ground-insulation.

While we have described our invention more particularly in reference to a construction in which the compensating winding has two coil-sides in each slot 16, we wish it to be understood that our invention is probably applicable to constructions in which a larger number of coil-sides are placed in each slot. While we have described our invention, also, more particularly with respect to a concentric-type compensating winding, having its coil-sides lying in slots which are provided in the pole-face portions of a salient-pole construction, it is probable that our invention is also of general applicability to any kind of concentric winding for a dynamo-electric machine, whether the core of the machine, which carries the winding-slots, is subdivided into discrete pole-pieces or not. We believe that it will be obvious that the foregoing and other changes may be made, in the precise form of embodiment of our invention, without departing from the essential spirit thereof. We desire, therefore, that the appended claims shall be accorded the broadest construction consistent with their language.

We claim as our invention:

1. A dynamo-electric machine having a stationary field-member characterized by main pole-pieces having slots in their pole-face portions, and a compensating winding in said pole-face slots, said compensating winding being a concentric winding comprising hairpin-type coils of heavy conductor-material, each hairpin-coil having two straight coil-sides joined at one end by an end-portion, said hairpin-coils being disposed in pairs, with their coil-sides paired in the same pole-face slots, there being only the two paired coil-sides in each slot, coil-to-coil insulation between the two paired coil-sides in each slot, insulation surrounding the pair of coil-sides to provide the ground-insulation in each slot, the ends of the paired coil-sides being separated from each other by considerably more than the thickness of said coil-to-coil insulation in the slots, and connectors joining a second end of one hairpin-coil to a first end of the next adjacent hairpin-coil, so as to serially connect the concentric coils of each pole.

2. The invention as defined in claim 1, characterized by the conductor-material of each hairpin-coil being strap-conductor material, and each of a plurality of said connectors comprising two heavy strap-conductors joined together at a plurality of points and lying one against the other except at their ends, said two heavy strap-conductors being separated from each other at each end of the connector so as to provide a forked construction embracing the associated coil-end.

3. A dynamo-electric machine having a core having slots for receiving the coil-sides of a concentric winding, and a concentric winding comprising hairpin-type coils of heavy conductor-material, each hairpin-coil having two straight coil-sides joined at one end by an end-portion, said hairpin-coils being disposed in pairs, with their coil-sides paired in the same slots, the two paired coil-sides lying in side-by-side relation to each other in each of said slots, coil-to-coil insulation between the two paired coil-sides in each slot, insulation surrounding the pair of coil-sides to provide the ground-insulation in each slot, the ends of the paired coil-sides being separated from each other by considerably more than the thickness of said coil-to-coil insulation in the slots, and connectors joining a second end of one hairpin-coil to a first end of the next adjacent hairpin-coil, so as to serially connect the successive coils of each group of concentric coils.

4. The invention as defined in claim 3, characterized by the conductor-material of each hairpin-coil being strap-conductor material, and each of a plurality of said connectors comprising two heavy strap-conductors joined together at a plurality of points and lying one against the other except at their ends, said two heavy strap-conductors being separated from each other at each end of the connector so as to provide a forked construction embracing the associated coil-end.

5. A dynamo-electric machine having a core having slots for receiving the coil-sides of a concentric winding, and a concentric winding comprising hairpin-type coils of heavy conductor-material, each hairpin-coil having two straight coil-sides joined at one end by an end-portion, said coils being paired in groups of a plurality of hairpin-coils each, with the grouped coil-sides of each group lying in the same slots, coil-to-coil insulation between the grouped coil-sides in each slot, insulation surrounding the group of coil-sides to provide the ground-insulation in each slot, the ends of the grouped coil-sides being separated from each other by considerably more than the thickness of said coil-to-coil insulation in the slots, and connectors joining a second end of one hairpin-coil to a first end of the next adjacent hairpin-coil, so as to serially connect the successive coils of each group of concentric coils.

6. The invention as defined in claim 5, characterized by the conductor-material of each hairpin-coil being strap-conductor material, and each of a plurality of said connectors comprising two heavy strap-conductors joined together at a plurality of points and lying one against the other except at their ends, said two heavy strap-conductors being separated from each other at each end of the connector so as to provide a forked construction embracing the associated coil-end.

CLARENCE A. ATWELL.
RICHARD H. WAGNER.

No references cited.